United States Patent
Rozen et al.

(10) Patent No.: US 9,841,977 B2
(45) Date of Patent: Dec. 12, 2017

(54) PROCESSOR CORE ARRANGEMENT, COMPUTING SYSTEM AND METHODS FOR DESIGNING AND OPERATING A PROCESSOR CORE ARRANGEMENT

(71) Applicants: Anton Rozen, Gedera (IL); Michael Priel, Netanya (IL); Leonid Smolyansky, Zichron Yakov (IL); Sergey Sofer, Rishon Lezion (IL)

(72) Inventors: Anton Rozen, Gedera (IL); Michael Priel, Netanya (IL); Leonid Smolyansky, Zichron Yakov (IL); Sergey Sofer, Rishon Lezion (IL)

(73) Assignee: NXP USA, Inc., Austin, TX (US)

( * ) Notice: Subject to any disclaimer, the term of this patent is extended or adjusted under 35 U.S.C. 154(b) by 322 days.

(21) Appl. No.: 14/646,988

(22) PCT Filed: Nov. 22, 2012

(86) PCT No.: PCT/IB2012/056630
§ 371 (c)(1),
(2) Date: May 22, 2015

(87) PCT Pub. No.: WO2014/080244
PCT Pub. Date: May 30, 2014

(65) Prior Publication Data
US 2015/0301828 A1    Oct. 22, 2015

(51) Int. Cl.
G06F 17/50    (2006.01)
G06F 9/30     (2006.01)
G06F 1/32     (2006.01)
G06F 9/28     (2006.01)
G06F 9/48     (2006.01)

(52) U.S. Cl.
CPC .......... *G06F 9/30189* (2013.01); *G06F 1/324* (2013.01); *G06F 9/28* (2013.01); *G06F 9/48* (2013.01); *G06F 17/5045* (2013.01); *G06F 2217/68* (2013.01); *G06F 2217/78* (2013.01); *Y02B 60/1217* (2013.01)

(58) Field of Classification Search
CPC .......... G06F 9/30189; G06F 9/28; G06F 9/48
USPC ....................................................... 716/133
See application file for complete search history.

(56) References Cited

U.S. PATENT DOCUMENTS

| | | | | |
|---|---|---|---|---|
| 7,461,275 B2* | 12/2008 | Belmont et al. | ...... | G06F 1/3228 713/300 |
| 7,814,343 B2* | 10/2010 | Kanno et al. | ......... | G06F 1/3203 257/347 |
| 8,041,976 B2 | 10/2011 | Kern et al. | | |
| 2007/0083785 A1 | 4/2007 | Sutardja | | |

(Continued)

OTHER PUBLICATIONS

International Search Report and Written Opinion correlating to PCT/IB2012/056630 dated Aug. 30, 2013.

*Primary Examiner* — Sun Lin

(57) ABSTRACT

The invention relates to a method of designing a processor core arrangement which comprises a first processor core for operation at a first operation frequency and having an associated first leakage and a second processor core for operation at a second operation frequency lower than the first operation frequency and having an associated second leakage lower than the associated first leakage. The processor core arrangement is capable of switching from the first processor core to the second processor core and vice versa.

8 Claims, 2 Drawing Sheets

(56) References Cited

U.S. PATENT DOCUMENTS

2007/0136617 A1 6/2007 Kanno et al.
2010/0083011 A1 4/2010 Onouchi et al.
2011/0022869 A1 1/2011 Rozen et al.

* cited by examiner

US 9,841,977 B2

PROCESSOR CORE ARRANGEMENT, COMPUTING SYSTEM AND METHODS FOR DESIGNING AND OPERATING A PROCESSOR CORE ARRANGEMENT

FIELD OF THE INVENTION

This invention relates to a method for designing and operating a processor core arrangement.

BACKGROUND OF THE INVENTION

One of the limiting factors of modern computer and semiconductor technology is power consumption. In particular, with the ability to produce smaller and smaller structures and devices, increased leakage currents occur even if devices are in idle states. One way of limiting an overall power consumption of a computing system and its total leakage is providing two processor cores which are designed to run at different speeds or frequencies and which by design have different leakages. Depending on the tasks performed and the processing power needed, there may be switched between the fast core and the slower core. The faster processor core is usually provided with a State Retention Power Gate (SRPG) function, enabling it to store state information when it is powered off. Such a SRPG function is usually provided by an arrangement of flip-flops to ensure fast storage and access to the state information.

SUMMARY OF THE INVENTION

The present invention provides a method for designing a processor core arrangement as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
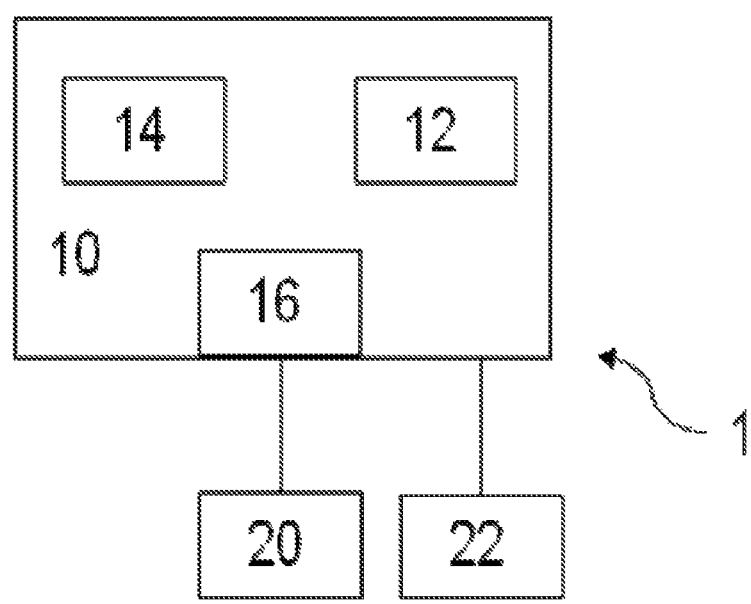
FIG. 1 schematically shows an example of an embodiment of a processor core arrangement in a computing system.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

In the context of this specification, a processor core arrangement may comprise two or at least two processor cores, e.g., three or more than three processor cores. The processor cores may be implemented on the same substrate and/or die and/or chip. It may be feasible to implement two or more processor cores of a processor core arrangement as an integrated circuit. The processor cores of a processor core arrangement may generally be of the same architecture type, but may be arranged to operate at different operational frequencies. A processor core arrangement may be a processor core arrangement in particular for a microcontroller, a digital signal processor device, a microprocessor arrangement. It may be envisioned that a processor core arrangement is a processor core arrangement for general application devices, in particular for mobile applications, e.g., smartphones, tablets, portable computers, and/or automotive applications. A processor core arrangement may comprise contacts and/or lines and/or registers and/or memory, in particular cache memory, e.g., level 1 cache memory, implemented on the processor core arrangement, in particular as part of the same circuitry and/or on the same substrate and/or die and/or chip. A processor core arrangement may be arranged to be able to utilize or operate one of its processor cores, whereas the other processor core or processor cores are kept idle and/or are powered off.

A processor core may be of a particular type of architecture, e.g., an ARM-type processor core. The architecture type of a processor core may be capable of supporting a State Retention Power Gating (SRPG) approach or structure, in particular a plurality of storage devices capable of storing state information of a processor core, e.g., a plurality of flip-flops. A processor core may be designed for operation at an operation frequency, which may generally be a maximum and/or nominal operation frequency. It may be considered that a processor core may be operated and/or operable at a lower frequency than its operation frequency. In particular, it may be envisioned that a processor core may be controlled to operate in a frequency range essentially up to and/or including the operation frequency. A processor core may be controlled or controllable into an idle mode and/or a powered off state. It may be envisioned that in an idle mode a processor core is essentially not performing any computational tasks. It may be considered that in a powered off mode, one or more subcircuits of a processor core are not supplied with power, e.g., they may be separated from a power supply. It may be envisioned that a processor core may be controllable and/or arranged to change its mode between an operational state and an idle mode and/or a powered off mode. State information of a processor core may be data transferred and/or stored by a processor core and associated devices while performing one or more computational tasks. State information in particular may refer to data and/or signal in registers, a cache, in particular a level 1 cache, and/or one or more pipelines associated to a processor core. In particular, state information of a processor core may be data stored and/or transferred in circuitry of the processor core and/or arranged on the processor core arrangement and/or the same substrate and/or die and/or chip.

The processor cores of a processor core arrangement may be operable separately from each other. It may be considered that a processor core arrangement is arranged to operate one of a first and a second processor core. A processor core not operated may be controlled or controllable into an idle mode and/or a power-off mode.

An asymmetric core arrangement is an example of a processor core arrangement in which two or more cores are designed differently. The cores may differ, for example, in characteristics such as operation frequency, power consumption, and instruction set. For instance, a first core of the arrangement may be capable of computing the value of a certain mathematical function by one instruction, that is, in a single clock cycle, whereas a second core may not be capable of performing this computation in a single clock cycle. For example, the first core may comprise a more powerful arithmetic logic unit than the second core. In another example, both cores may have the same instruction set but operate at different operation frequencies and accordingly have different power consumption characteristics.

A processor core arrangement, and notably an asymmetric one, may be arranged to be able to switch between its processor cores, in particular in dependence on a computational load. The computational load may, for example, be measured in terms of a percentage of idle cycles, that is, the percentage of clock cycles of a given processor during which the processor does not execute an instruction. When the processor executes an instruction in every clock cycle, the processor is operating at full load. A sequence of idle cycles may also be referred to as an idle time. The switch may, for instance, be performed in response to detecting that the percentage of idle cycles determined over a recent sequence of clock cycles is less than a critical value. In another example, a switch from a first core to a second core may be performed in response to detecting that a queue of tasks of the first core has reached a length exceeding a critical length.

Switching between processor cores may comprise transferring the computational tasks to be performed, e.g., threads, tasks, programs and/or state information, from one core to another core. The core receiving the computational task may be operated to perform the task or tasks. It may be envisioned that the core switched from is controlled to be unused, e.g., controlled into its idle mode or to be powered off. It may be considered that switching comprises the core being switched to accessing data regarding the computational tasks and/or state information of the core switched from. The core switched to may be arranged to read and/or take over data and/or state information, e.g. via shadow registers. It may be considered that the processor cores of a processor core arrangement are arranged to share at least some registers and/or pipelines and/or cache memory and/or data transfer and/or storage devices.

The leakage of a processor core comprises an energy loss. It may be caused by quantum-mechanical tunnelling of charge carriers. The leakage is related to the design of the processor core, in particular to its operation frequency, the size of the structures of the processor core, e.g., the size of insulation layers, and/or the type of materials and/or dotage used as well as the type of devices implemented. For example, the leakage of a transistor may be considered to be dependent on its threshold voltage. In particular, transistors with a higher threshold voltage may be considered to have a lower leakage than transistors with a lower threshold voltage. On the other hand, transistors with a lower threshold voltage may be quicker to switch and operate and thus are often used in processor cores with higher operation frequencies. Accordingly, the leakage of processor cores even of similar or equal architecture may vary depending on the type of devices implemented, in particular depending on the types of transistors used. It may e.g., be considered to implement two processor cores of a processor arrangement to be of identical architectural type, but using different types of transistors. Accordingly, the processor core using the slower transistors will be slower, in particular, have a lower operation frequency, but also will have a lower leakage. Leakage may occur when power is supplied to a processor core even when it is in an idle mode.

A processor core arrangement may be considered comprising a first and a second processor core, the first processor core being designed at a higher operation frequency than the second processor core. It may be envisioned that the first processor core is arranged to be operable in a burst mode, e.g., by switching from the second processor core to the first processor core. Such switching may be performed, for example, when a high computational load is provided. Switching back from the first processor core to the second processor core may be performed, e.g., when the computational load is reduced and/or at regular intervals. In particular if the processor core not being used is powered off, this approach may considerably lower the average leakage of a processor core arrangement.

One common way of limiting the leakage of a processor core is to provide a SRPG feature. Such a feature may allow storing state information when powering and/or turning off significant parts of the core when it is not in use. If the core is powered or turned on again, it may quickly access the state information stored and proceed almost without interruption. In the powered off state of a core, it requires a significantly lower amount of power and shows much reduced leakage. In particular, a hardware SRPG feature may allow switching between cores according to processing power needed and to quickly turn off and turn on a processor core implementing the SRPG feature. A hardware SRPG feature may generally comprise one or more non-volatile storage units, e.g., flip-flops, arranged to store state information of an associated processor core, in particular when the processor core is controlled to change into its powered off mode. A processor core may be arranged to access the SRPG feature when it is controlled to change into its powered on or operational mode. In this case, it may continue with its operation where it was before it was powered off. A SRPG feature is usually designed such that on average, during typical use and with typical powered off phases, the overall leakage of a processor core arrangement is reduced. However, a SRPG features requires area on a die or chip for the storage units. A processor core or and/or architecture may be arranged to be able to support a SRPG feature, even if such a feature is not implemented.

Generally, there may be considered a processor core arrangement comprising a first processor core designed for operation at a first operation frequency and having an associated first leakage, the first processor core being implemented without SRPG feature. The processor core arrangement may comprise a second processor core designed for operation at a second operation frequency lower than the first operation frequency and having an associated second leakage lower than the first leakage. The processor core arrangement may be arranged to be capable of switching from the first processor core to the second processor core and vice versa. The second leakage may be considered to correspond to the difference of leakages if it is between 50% and 200%, 50% and 150%, 60% and 140%, 70% and 130%, 80% and 120%, 90% and 110% of the difference in leakages. A first processor core including a SRPG feature may be essentially identical to the first processor core, but be provided with a SRPG feature. In particular, it may be identical regarding its architecture, design and/or operation frequency. In this context, the leakage of the first processor core including a SRPG feature may be a theoretical leakage, which may be based on calculation and/or simulation and/or experiment, without the corresponding processor core being physically present or existent. It may be considered that the second processor core is implemented without a SRPG feature. The first operation frequency may be at least double the second operation frequency. It may be envisioned that the second operation frequency is at least a quarter or a third or half of the first operation frequency. Generally, the first operation frequency may be 1 GHz or higher, 1.1 GHZ or higher, 1.2 GHz or higher and/or 1.4 GHz or higher. It may be contemplated that the second operation frequency is lower than 1 GHz. It may be envisioned that the second operation frequency is between 200 MHz and 1 GHz. In particular, the second operation frequency may be 200 MHz or higher, 300 MHz or higher, 400 MHz or higher or 500 MHz or higher. The second operation frequency may be chosen higher than usually required for the task typically performed by the second processor core. Generally, it may be envisioned that the second processor core is operated more extensively than usually, such that the first processor core is utilized less. On average, this leads to a reduction in leakage of the processor core arrangement, as the first processor core may be in its powered off mode for longer periods of time. It may be feasible to implement the first processor core and the second processor core on the same substrate and/or die and/or chip and/or as parts of the same integrated circuit. The first processor core may be operable in a burst mode. In particular, the first processor core may be arranged to take over data and/or state information of the second processor core when powered on to take over one or more computational tasks from the second processor core. There may be provided suitable circuitry allowing taking over this data and/or state information, e.g., one or more shadow registers shadowing the state of the second processor core. It may be considered that the first processor core and the second processor core are being arranged to utilize data and/or state information of the respective other core when switching between the first processor core and the second processor core. There may be provided suitable circuitry allowing taking over and/or utilizing data and/or state information of the respective other processor core. According to a variant, the processor core arrangement may be arranged such that first processor core is of the same architecture type as the second processor core. In particular, the processor cores may be ARM-based cores, in particular of the same type, designed with different operational frequencies.

There may be considered a computing system with a processor core arrangement as described herein. The computing system may comprise memory, e.g., cache memory and/or RAM. It may be envisioned that the computing system comprises a mainboard, on which the processor core arrangement may be arranged, and/or peripheral devices, for example storage devices, graphic devices, audio devices, etc.

A method of designing a processor core arrangement may be envisioned, which in particular may be a method of designing a processor core arrangement as described herein. The method may comprise designing a first processor core to operate at a first frequency and having an associated first leakage, the first processor core being designed without SRPG feature. The method of designing may further comprise one or more manufacturing steps to produce the designed processor core arrangement.

There may be considered a method of operating a processor core arrangement as described herein and/or a computing system as described herein, the method comprising switching between a first processor core and a second processor core depending on computational load. In particular, switching may be performed from the second processor core to the first processor core when a computational load is larger than a first load level. Switching may be performed from the first processor core to the second processor core when the computational load is lower than a second load level.

Now referring to FIG. 1, there is schematically shown a computing system 1 comprising a processor core arrangement 10. The processor core arrangement 10 may comprise a first processor core 12, which may be implemented without SRPG feature. It may be considered that the processor core arrangement 10 comprises a second processor core 14, which may be implemented without SRPG feature. The first processor core 12 may be designed for operation at a first operation frequency, and may have an associated first leakage. The second processor core 14 may be designed for operation at a second operation frequency lower than the first frequency and may have an associated second leakage lower than the first leakage.

The processor core arrangement 10 may be arranged to switch between the first processor core 12 and the second processor core 14 depending on computational load. For example, an operating system of the processor core arrangement 10 may determine that the computational load is too high for the second processor core 14 and therefore switch from the second processor core 14 to the first processor core 12. The computational load may be defined, e.g., as described above or, e.g., as a number of instructions to be executed by the processor core arrangement 10 within a given time. The computational load may be defined as too high for the second processor core 14 when, e.g., the number of instructions per second exceeds the second operation frequency or when, e.g., a length of an instruction queue has exceeded a critical length.

Figure 2:
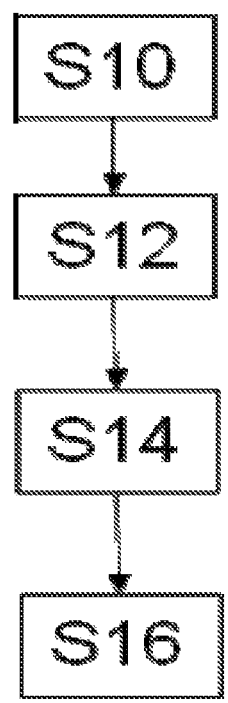
FIG. 2 schematically shows a diagram of a method of designing a processor arrangement.

The processor core arrangement 10 may comprise a cache memory 16, data lines, registers and contacts, some of which may be shared between the first processor core 12 and the second processor core 14. The cache memory 16 may comprise a level 1 cache memory and/or a level 2 cache memory. There may be provided suitable circuitry enabling exchanging data and/or state information between the first processor core 12 and the second processor core 14 when switching, e.g., suitable shadow registers. The computing system 1 may comprise a memory arrangement 20, which may be connected or connectable to the processor core arrangement 10, in particular via the cache arrangement 16. There may be provided peripheral devices 22, which may be connected or connectable to the processor core arrangement 10. During operation, the processor core arrangement 10 may switch between the first processor core 12 and the second processor core 14 depending on a computational load. When switching, the processor core 12, 14 switched to may take over and/or utilize data and/or state information of the processor core switched from. As the second processor core 14 may be considered to have a higher operation frequency than it would have in a regular setup, in which the first processor core 12 would have a SRPG feature, it may be used for more demanding computational tasks. Accordingly, the first processor core 12 may be controlled to be in its powered off mode for longer periods of time. FIG. 2 schematically shows a diagram of a method of designing a processor core arrangement, which may be a processor core arrangement as described herein, in particular a processor core arrangement 10 as shown in FIG. 1. The processor core arrangement 10 may be operated or simulated with the first processor core having a SRPG feature. The simulation may be done on a computer. A reference leakage of the first processor core and the second processor core may thus be determined (S10), the reference leakage being the combined leakage of the first core and the second core, i.e., the leakage of the first core plus the leakage of the second core. This combined leakage may be the sum of the first leakage and the second leakage, averaged over a test period. The test period may comprise several, possibly many, clock cycles of the first or second processor core. The test period may also comprise several, possibly many, switches between the first core and the second core.

The SRPG feature is omitted or deactivated in the actual implementation of the processor core arrangement 10 (S12). The operation frequency of the second processor core 14 (the second operation frequency) may then be set such that the actual combined leakage of the first and second processor cores 12 and 14 is substantially equal to the reference leakage (S14).

The method may further comprise manufacturing the designed processor core arrangement with the first processor core and the second processor core (S16).

The processor core arrangement, computing system and methods described herein provide and/or allow use of a processor core arrangement with a low average leakage. By utilizing a second processor core with a relatively high operation frequency, in particular, with an operation frequency chosen to be higher than required for most ordinary tasks, the first processor core may be controlled into its powered off mode for longer periods of time. Due to the first processor core having a higher operational frequency than the second processor core and accordingly a significantly higher leakage, the leakage contribution of the first processor core may be significantly lowered. The processor core arrangement therefore has a surprisingly low average leakage even when none of the first and second processor cores is provided with an SRPG feature. Thus, valuable die area and manufacturing costs may be saved.

The invention, in particular the methods, may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

For example, the semiconductor substrate described herein can be any semiconductor material or combinations of materials, such as gallium arsenide, silicon germanium, silicon-on-insulator (SOI), silicon, monocrystalline silicon, the like, and combinations of the above.

The connections and lines as discussed herein may be any type of connection suitable to transfer signals and/or data from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, a cache memory may be directly implemented and/or associated to each of the processor cores, such that each processor core may be provided with its own cache, in particular with its own level 1 cache.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the processor cores may be implemented on a single circuit and/or substrate and/or die and/or chip. Alternatively, the examples may be implemented as any number of separate integrated circuits or separate devices interconnected with each other in a suitable manner. For example, a cache memory may be implemented separately, in particular a level 2 cache memory.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of designing a processor core arrangement, the method comprising:
    operating a processor core arrangement, or simulating the processor core arrangement, with a first processor core having a SRPG (state retention power gate) feature in an operation in said operating or a simulation in said simulating, to determine a combined leakage of the first processor core and a second processor core, wherein
        the processor core arrangement comprises a first processor core configured to operate at a first operation frequency and having an associated first leakage, and the second processor core configured to operate at a second operation frequency that is lower than the first operation frequency and having an associated second leakage that is lower than the associated first leakage, and
        the processor core arrangement is configured to switch from the first processor core to the second processor core and vice versa;
    choosing said combined leakage as a reference leakage;
    omitting or deactivating said SRPG feature of said first processor core; and
    setting said second operation frequency such that the combined leakage of said first processor core and said second processor core, with said SRPG feature omitted or deactivated, is substantially equal to said reference leakage.

2. The method of claim 1, wherein the first operation frequency is at least double the second operation frequency.

3. The method of claim 1, wherein the second operation frequency is at least a quarter or a third or a half of the first operation frequency.

4. The method of claim 1, further comprising:
    implementing the first processor core and the second processor core on one of a same substrate, a same die, a same chip, or as parts of a same integrated circuit.

5. The method of claim 1, wherein the first processor core is operable in a burst mode.

6. The method of claim 1, further comprising:
    arranging the first processor core and the second processor core to utilize or take over state information of the respective other processor core when switching between the first processor core and the second processor core.

7. The method of claim 1, wherein the first processor core and the second processor core have a same architecture type.

8. The method of claim 1, wherein said simulation comprises:
    switching between said first processor core and said second processor core depending on a computational load.

* * * * *